United States Patent
Suzuki et al.

(10) Patent No.: US 7,742,704 B2
(45) Date of Patent: Jun. 22, 2010

(54) VISIBLE LIGHT CONTROL APPARATUS, VISIBLE LIGHT CONTROL CIRCUIT, VISIBLE LIGHT COMMUNICATION APPARATUS, AND VISIBLE LIGHT CONTROL METHOD

(75) Inventors: Shuuji Suzuki, Tokyo (JP); Ryuhei Fujiwara, Tokyo (JP)

(73) Assignee: NEC Corporation, Tokyo (JP)

( * ) Notice: Subject to any disclaimer, the term of this patent is extended or adjusted under 35 U.S.C. 154(b) by 892 days.

(21) Appl. No.: 11/540,222

(22) Filed: Sep. 29, 2006

(65) Prior Publication Data

US 2007/0092264 A1    Apr. 26, 2007

(30) Foreign Application Priority Data

Sep. 30, 2005    (JP) .............................. 2005-286711

(51) Int. Cl.
    *H04B 10/04* (2006.01)
(52) U.S. Cl. .................. 398/183; 398/182; 398/189; 398/186; 398/196; 398/197
(58) Field of Classification Search ............... 398/182, 398/183, 185, 186, 187, 189, 190, 191, 192, 398/193, 194, 135, 115, 116, 117, 127, 128, 398/130, 136, 138, 141, 140, 196, 197, 118
See application file for complete search history.

(56) References Cited

U.S. PATENT DOCUMENTS

| 6,388,784 | B1 * | 5/2002 | Nakamura et al. ........ 398/140 |
| 2002/0093838 | A1 | 7/2002 | Beij et al. |
| 2006/0056855 | A1 * | 3/2006 | Nakagawa et al. ........ 398/183 |

FOREIGN PATENT DOCUMENTS

| JP | 5-344062 | 12/1993 |
| JP | 11-205224 | 7/1999 |
| JP | 2000-209156 | 7/2000 |
| JP | 2004-72365 | 3/2004 |
| JP | 2004-246274 | 9/2004 |
| JP | 2005-216780 | 8/2005 |
| JP | 2005-218066 | 8/2005 |
| JP | 2006-325085 | 11/2006 |
| JP | 2007-43706 | 2/2007 |

* cited by examiner

*Primary Examiner*—Hanh Phan
(74) *Attorney, Agent, or Firm*—Scully, Scott, Murphy & Presser, P.C.

(57) ABSTRACT

There is provided a visible light control apparatus including: a modulation unit (corresponding to a PPM signal generation circuit, a subcarrier generation circuit, and a first AND circuit) that modulates a subcarrier and thereby generates a modulated signal; a visible light control unit (corresponding to a driving circuit) that controls blinking of visible light which contains information based on the modulated signal modulated by the modulation unit and allows the visible light to be emitted at a predetermined emission time ratio; and an emission time ratio control unit (corresponding to a dimming signal generation circuit, an inverting circuit, a second AND circuit, and an OR circuit) that changes the predetermined emission time ratio and allows the visible light to be emitted at the changed emission time ratio.

19 Claims, 14 Drawing Sheets

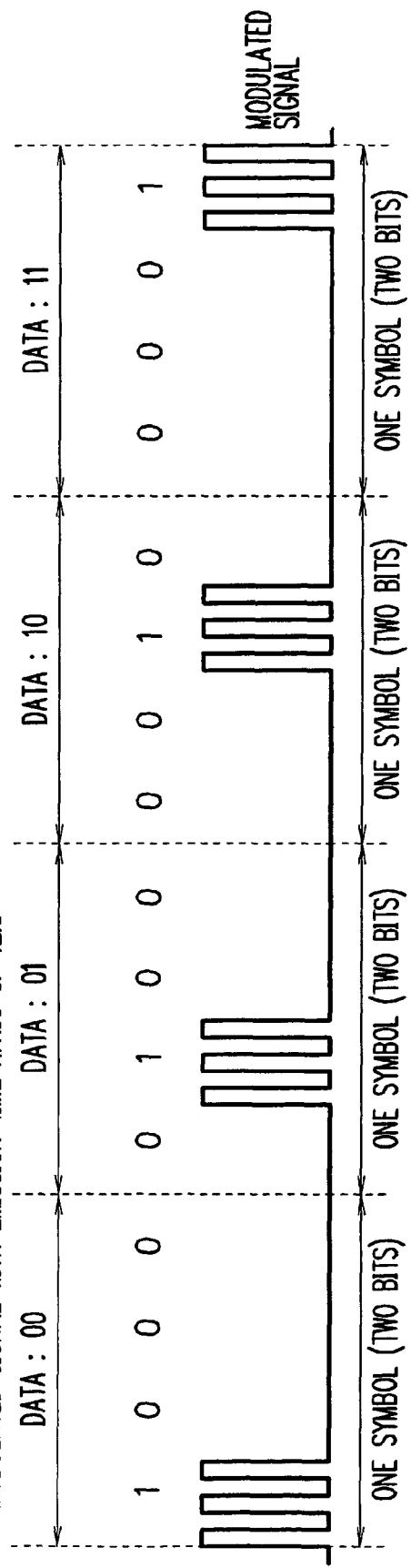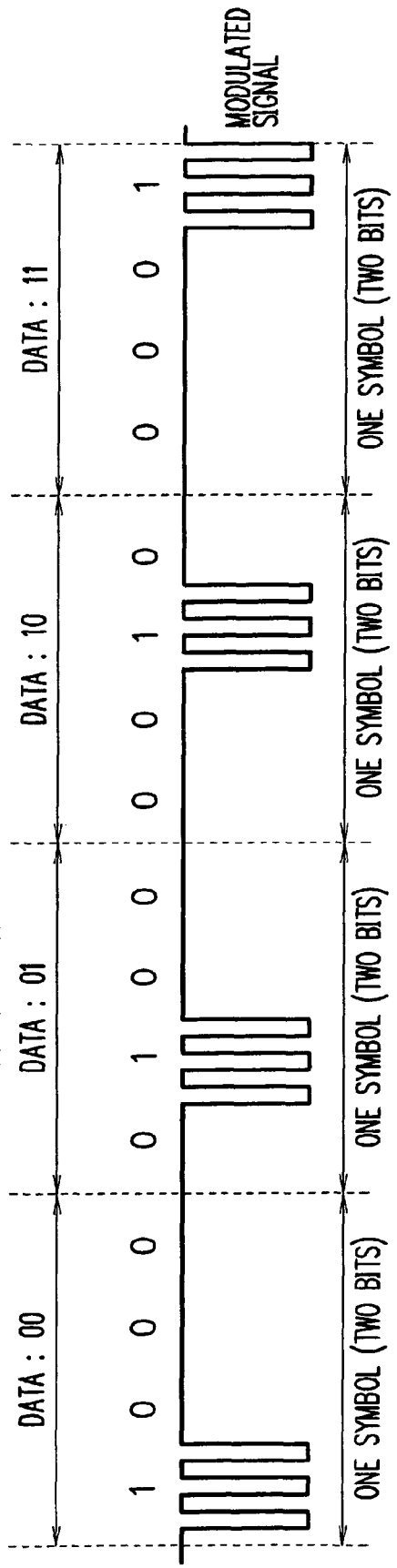

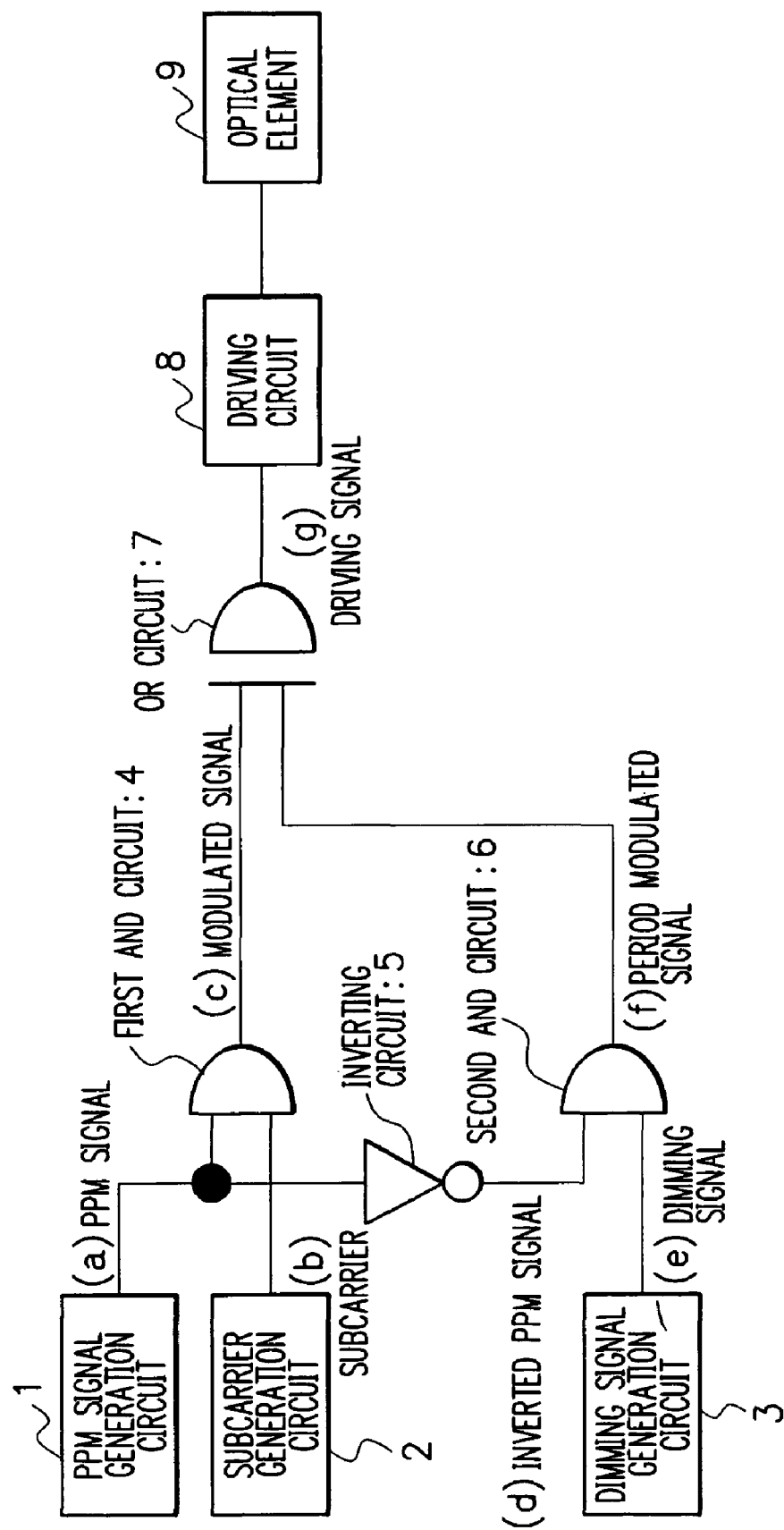

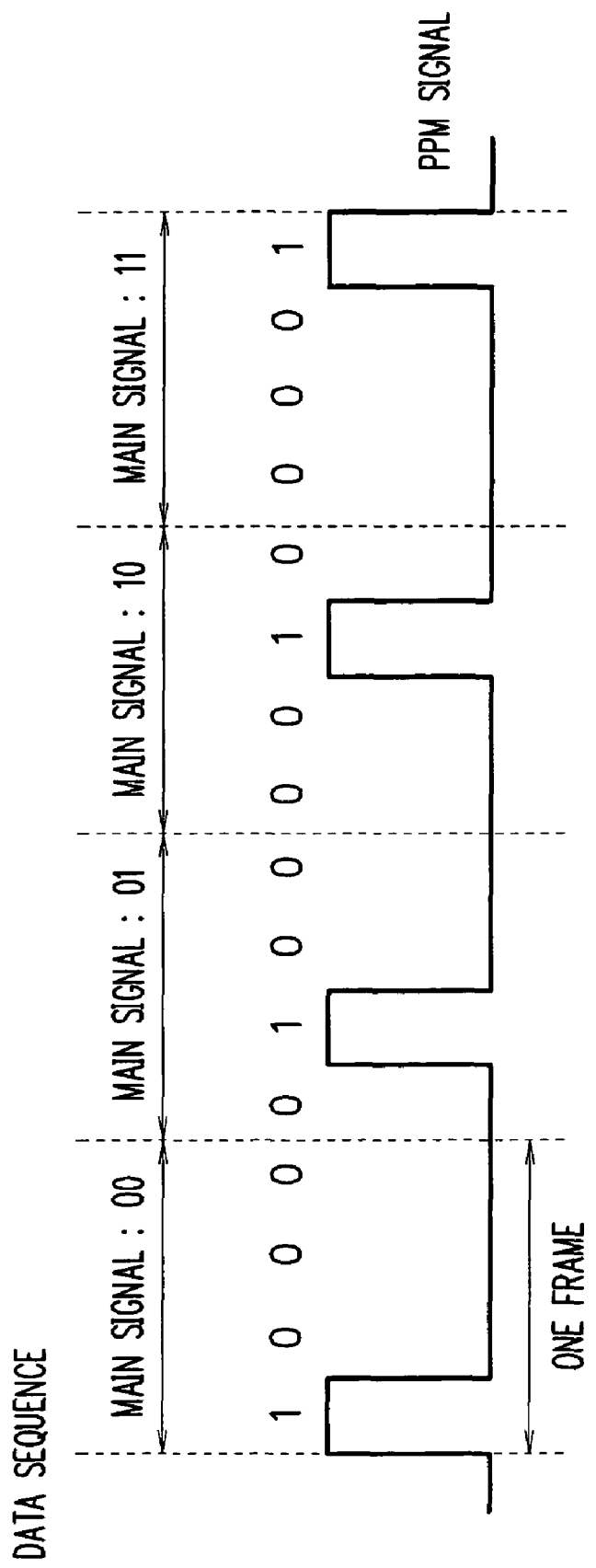

F I G. 10
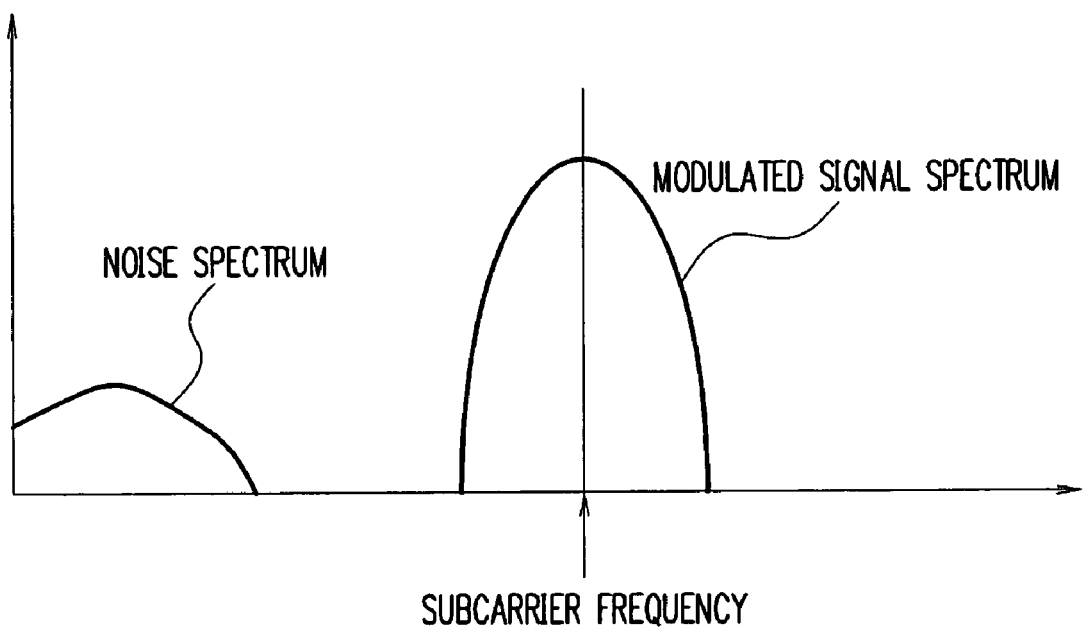

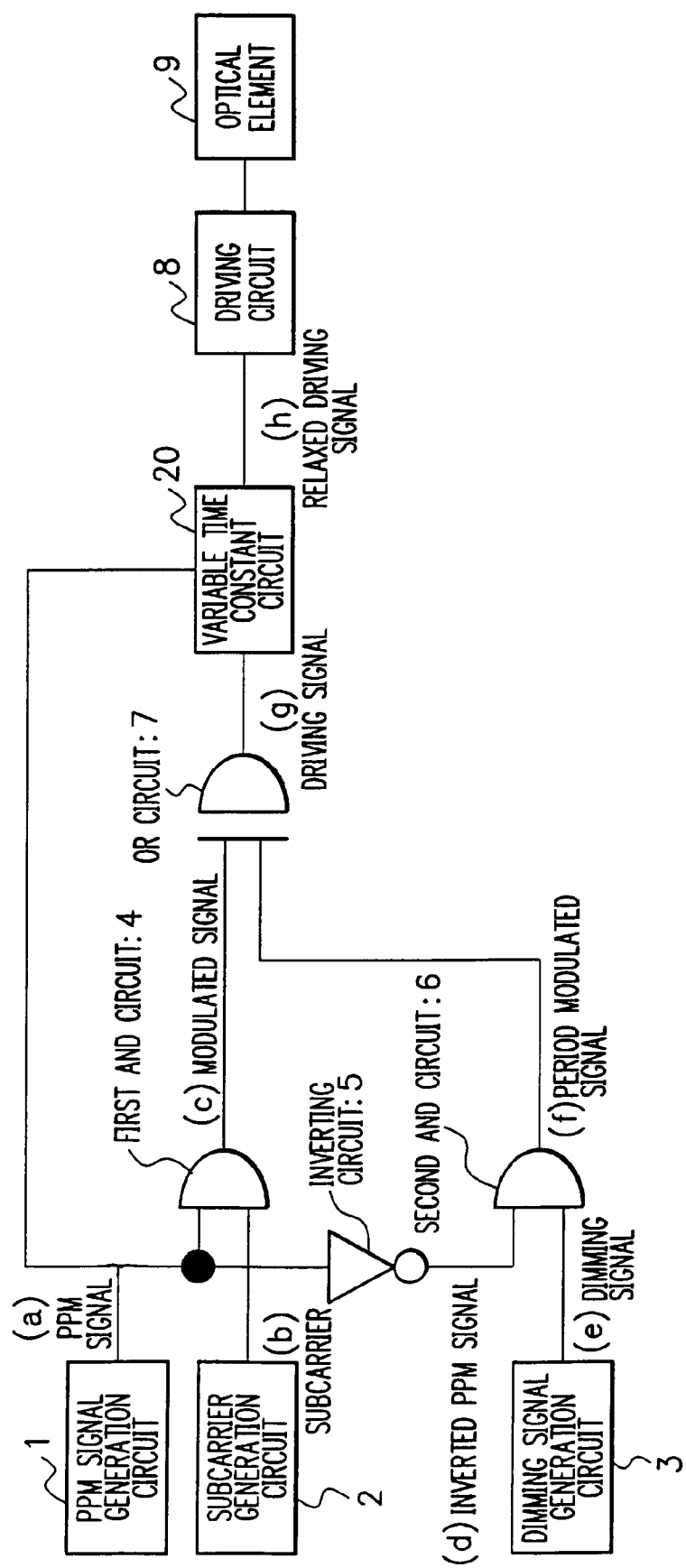
F I G. 11

F I G. 12
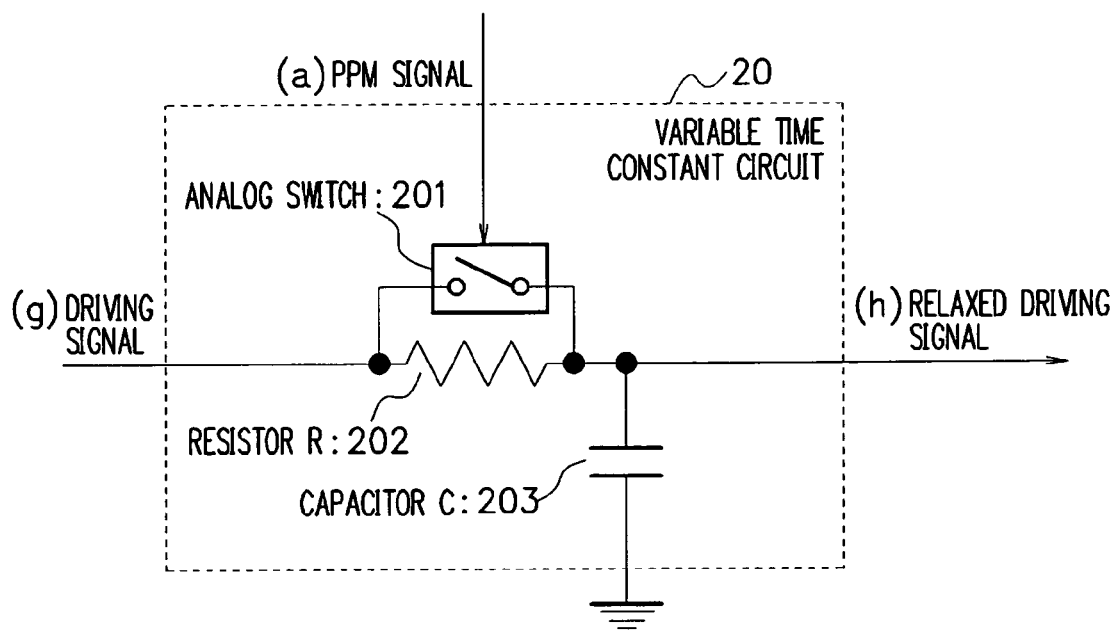
ANALOG SWITCH 201 IS TURNED
ON WITH SIGNAL OF "1" AND IS TURNED OFF WITH SIGNAL OF "0"
WHEN ANALOG SWITCH 201 IS TURNED OFF, TIME CONSTANT WHICH IS DETERMINED
BY CR IS LARGE, AND WHEN ANALOG SWITCH 201 IS TURNED ON, R IS LOW AND
TIME CONSTANT IS SMALL F I G. 13
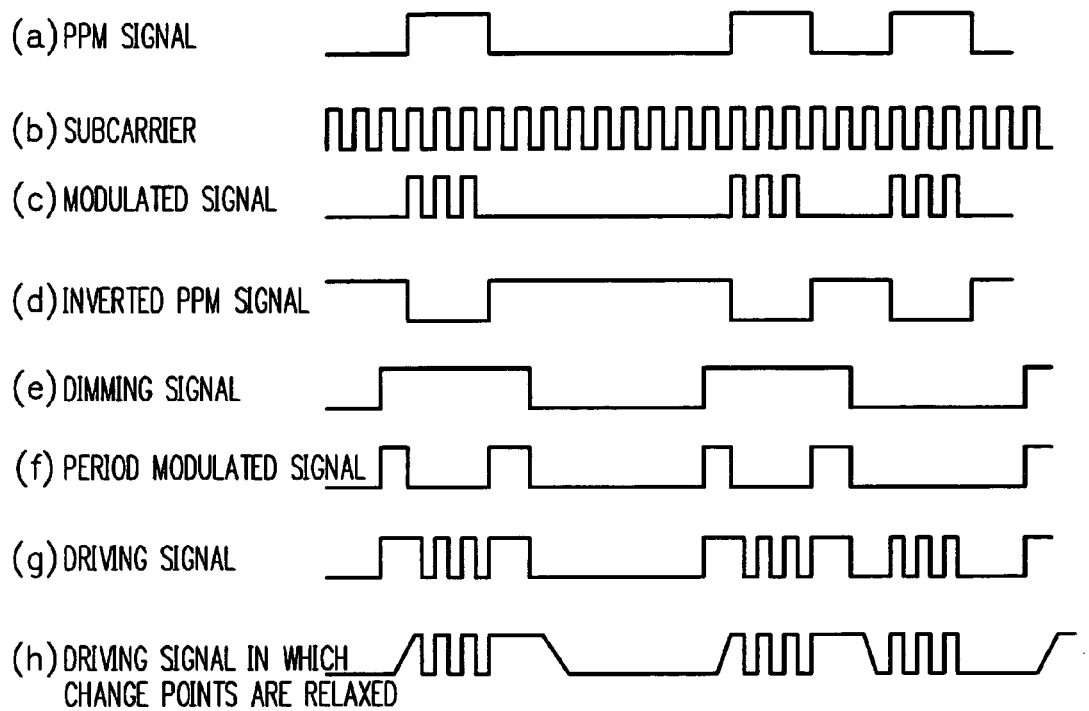

VISIBLE LIGHT CONTROL APPARATUS, VISIBLE LIGHT CONTROL CIRCUIT, VISIBLE LIGHT COMMUNICATION APPARATUS, AND VISIBLE LIGHT CONTROL METHOD

BACKGROUND OF THE INVENTION

1. Field of the Invention

The present invention relates to a visible light (light that the human eye can see) control apparatus and a visible light control circuit that control blinking of visible light, a visible light communication apparatus that performs information communication using visible light that is controlled by the visible light control apparatus, a visible light control apparatus having mounted thereon the visible light control circuit, or controlled by the visible light control circuit, and a visible light control method for the visible light control apparatus.

2. Description of the Related Art

Conventionally, infrared rays, which are invisible to the human eye, are used when information communication is performed. The reasons for this are that infrared rays have higher transmission efficiency than visible light and visible light is likely to be visually annoying or obstructive to persons.

Visible light, however, allows a person to visually identify a visible light receivable region and thus is superior to infrared rays in terms of convenience, entertainment, etc., depending on the application. Visible light is a type of wave that is the same as radio waves and thus is, needless to say, capable of transmitting information.

Hence, for a technical document filed prior to the present invention, there is a document that discloses a location information communication apparatus which includes: a location data unit that generates location information; a modulation unit that modulates an electrical signal on a power line based on the location information from the location data unit; and an illumination unit that generates illumination light by the electrical signal modulated based on the location information, and which performs communication of the location information by utilizing optical wireless communication by the illumination light (visible light) (see patent document 1, for example).

In addition, there is a document that describes the possibility of visible light communication (see non-patent document 1, for example).

Visible light has important characteristics, i.e., high-speed blinking. By allowing the visible light to blink at a high speed that the human eye cannot perceive, various information can be transmitted. Therefore, by performing information communication using visible light, various problems associated with wireless communication and infrared-ray communication can be overcome, and ubiquitous (omnipresent) and ultrahigh-speed communication that does not adversely affects the human body or an electronic device can be performed.

[Patent Document 1] Japanese Patent Application Laid-Open No. 2005-218066

[Non-Patent Document 1] Masao Nakagawa, "Ubiquitous Visible Light Communications", the Transactions of the Institute of Electronics, Information and Communication Engineers (IEICE), IEICE Transactions on Communications 2005, B Vol. J-88-B, No. 2, pp. 351-359

SUMMARY OF THE INVENTION

A major visible light communication method is as follows. A subcarrier is modulated and thereby a modulated signal shown in FIGS. 1A and 1B is generated. Based on the modulated signal, blinking of visible light is controlled. The visible light is emitted at a predetermined emission time ratio and the visible light which contains information is transmitted. FIG. 1A shows a modulated signal for the case in which visible light is emitted at an emission time ratio of 12.5%. In this case, when the modulated signal is 1, a carrier signal is generated and the visible light is turned on, and when the modulated signal is 0, the visible light is turned off. FIG. 1B shows a modulated signal which is an inverted version of the modulated signal shown in FIG. 1A, for the case in which visible light is emitted at an emission time ratio of 87.5%. Also in this case, when the modulated signal is 1, a carrier signal is generated and the visible light is turned on, and when the modulated signal is 0, the visible light is turned off. In the modulated signal shown in FIG. 1B, the time period during which the visible light is turned on is longer than that in the modulated signal shown in FIG. 1A, and thus, the modulated signal shown in FIG. 1B can emit brighter visible light for the same peak current.

In the aforementioned communication method, the emission time ratio is fixed to 12.5% or 87.5%, as shown in FIGS. 1A and 1B, and thus, the brightness of visible light cannot be adjusted to an arbitrary level. Hence, there is a demand for adjustment of the brightness of visible light to an arbitrary level. However, although the aforementioned patent document 1 and non-patent document 1 disclose the emission of visible light which contains information, there is no consideration at all of the adjustment of the brightness of the visible light to an arbitrary level by changing an emission time ratio, based on which the visible light is emitted.

The present invention is made in view of the foregoing and other problems. An object of the present invention is therefore to provide a visible light control apparatus, a visible light control circuit, a visible light communication apparatus, and a visible light control method, which are capable of adjusting the brightness of visible light to an arbitrary level.

To obtain the above-described object, the present invention has the following features.

A visible light control apparatus of the present embodiments includes: modulation means for modulating a subcarrier and thereby generating a modulated signal; and visible light control means for controlling, based on the modulated signal which is generated by the modulation means, blinking of visible light which contains information and allowing the visible light to be emitted at a predetermined emission time ratio; emission time ratio control means for changing the predetermined emission time ratio and allowing the visible light to be emitted at the changed emission time ratio.

The visible light control apparatus of the present embodiments may further comprise emission time ratio relaxation control means for relaxing a rate of change over time of the changed emission time ratio at a change point and allowing the visible light to be emitted at the relaxed emission time ratio.

In the visible light control apparatus of the present embodiments, the emission time ratio control means may include: period modulated signal generation means for generating a period modulated signal that changes a period of the modulated signal which is generated by the modulation means; and driving signal generation means for combining the period modulated signal which is generated by the period modulated signal generation means and the modulated signal which is generated by the modulation means, and thereby generating a driving signal that controls the blinking of the visible light, and the emission time ratio control means may control the blinking of the visible light based on the driving signal generated by the driving signal generation means, change the predetermined emission time ratio, and allow the visible light to be emitted at the changed emission time ratio.

In the visible light control apparatus of the present embodiments, the modulation means may include: signal conversion means for converting a main signal to a multilevel PPM (Pulse Position Modulation) signal or an inverted multilevel PPM signal which is an inverted version of the multilevel PPM signal, and the modulation means may modulate the subcarrier based on the multilevel PPM signal or the inverted multilevel PPM signal which is converted by the signal conversion means, and thereby may generate the modulated signal.

In the visible light control apparatus of the present embodiments, the period modulated signal generation means may include: dimming signal generation means for generating a dimming signal for changing the predetermined emission time ratio, and the period modulated signal generation means may combine the dimming signal generated by the dimming signal generation means and the multilevel PPM signal or the inverted multilevel PPM signal which is converted by the signal conversion means, and thereby may generate the period modulated signal.

In the visible light control apparatus of the present embodiments, the dimming signal generation means may include: adjustment means for adjusting a duty ratio of the dimming signal, and the dimming signal generation means may generate the dimming signal whose duty ratio is adjusted by the adjustment means.

In the visible light control apparatus of the present embodiments, the emission time ratio relaxation control means may relax, based on the multilevel PPM signal or the inverted multilevel PPM signal which is converted by the signal conversion means, a rate of change over time of the changed emission time ratio at a change point.

The visible light control apparatus of the present embodiments may further comprise signal selection means for selecting one of the multilevel PPM signal and the inverted multilevel PPM signal which is converted by the signal conversion means.

A visible light control circuit of the present embodiments includes: a modulation circuit that modulates a subcarrier and thereby generates a modulated signal; and a driving circuit that controls, based on the modulated signal which is generated by the modulation circuit, blinking of visible light to be emitted from an optical element and allows the visible light to be emitted from the optical element at a predetermined emission time ratio; a dimming signal generation circuit that generates a dimming signal for changing the predetermined emission time ratio which is based on the modulated signal; and a driving signal generation circuit that generates, based on the dimming signal generated by the dimming signal generation circuit, a driving signal which is obtained by changing a period of the modulated signal which is generated by the modulation circuit, wherein the driving circuit controls the blinking of the visible light to be emitted from the optical element, based on the driving signal generated by the driving signal generation circuit, and thereby allows the visible light to be emitted from the optical element at an emission time ratio which is obtained by changing the predetermined emission time ratio which is based on the modulated signal.

A visible light communication apparatus of the present embodiments has mounted thereon the above-described visible light control apparatus or visible light control circuit, wherein the visible light control apparatus or the visible light control circuit controls blinking of visible light to be emitted from the optical element and transmits the visible light.

A visible light control method of the present embodiments is performed by a visible light control apparatus that controls blinking of visible light which contains information, the method comprising: a modulation step of modulating a subcarrier, whereby a modulated signal is generated; a visible light control step of controlling, based on the modulated signal which is generated in the modulation step, the blinking of the visible light and allowing the visible light to be emitted at a predetermined emission time ratio; and an emission time ratio control step of changing the predetermined emission time ratio and allowing the visible light to be emitted at the changed emission time ratio.

The visible light control method of the present embodiments may further comprise an emission time ratio relaxation control step of relaxing a rate of change over time of the changed emission time ratio at a change point and allowing the visible light to be emitted at the relaxed emission time ratio.

The visible light control method of the present embodiment may further comprise: a period modulated signal generation step of generating a period modulated signal that changes a period of the modulated signal which is generated in the modulation step; and a driving signal generation step of combining the period modulated signal which is generated in the period modulated signal generation step and the modulated signal which is generated in the modulation step, whereby a driving signal that controls the blinking of the visible light may be generated, wherein in the emission time ratio control step, the blinking of the visible light may be controlled based on the driving signal generated in the driving signal generation step, the predetermined emission time ratio may be changed, and the visible light may be allowed to be emitted at the changed emission time ratio.

The visible light control method of the present embodiments may further comprise a signal conversion step of converting a main signal to a multilevel PPM (Pulse Position Modulation) signal or an inverted multilevel PPM signal which is an inverted version of the multilevel PPM signal, wherein in the modulation step, the subcarrier may be modulated based on the multilevel PPM signal or the inverted multilevel PPM signal which is converted in the signal conversion step, whereby the modulated signal may be generated.

The visible light control method of the present embodiments may further comprise a dimming signal generation step of generating a dimming signal for changing the predetermined emission time ratio, wherein in the period modulated signal generation step, the dimming signal generated in the dimming signal generation step and the multilevel PPM signal or the inverted multilevel PPM signal which is converted in the signal conversion step may be combined, whereby the period modulated signal may be generated.

The visible light control method of the present embodiments may further comprise an adjustment step of adjusting a duty ratio of the dimming signal, wherein in the dimming signal generation step, the dimming signal whose duty ratio is adjusted in the adjustment step may be generated.

In the visible light control method of the present embodiments, in the emission time ratio relaxation control step, based on the multilevel PPM signal or the inverted multilevel PPM signal which is converted in the signal conversion step, a rate of change over time of the changed emission time ratio at a change point may be relaxed.

The visible light control method of the present embodiments may further comprise a signal selection step of selecting one of the multilevel PPM signal and the inverted multilevel PPM signal which is converted in the signal conversion step.

According to the present embodiments, by changing the predetermined emission time ratio and allowing visible light to be emitted at the changed emission time ratio, the visible light can be adjusted to an arbitrary brightness level.

BRIEF DESCRIPTION OF THE DRAWINGS

FIGS. 1A and 1B are diagrams showing modulated signals whose emission time ratios are fixed to 12.5% and 87.5%, respectively;

FIG. 2 is a diagram showing a configuration of a visible light control apparatus (visible light control circuit) according to a first embodiment;

FIG. 3 is a diagram describing position modulation which is performed by a PPM signal generation circuit 1;

FIG. 10 is a diagram showing a state of noise that occurs when a visible light control apparatus (visible light control circuit) according to a fourth embodiment adjusts visible light to an arbitrary brightness level;

FIG. 11 is a first diagram showing a configuration of the visible light control apparatus (visible light control circuit) according to the fourth embodiment;

FIG. 12 is an exemplary internal configuration of a variable time constant circuit 20 that composes the visible light control apparatus (visible light control circuit) according to the fourth embodiment;

FIG. 13 is a diagram showing signals outputted from circuits that compose the visible light control apparatus (visible light control circuit) according to the fourth embodiment that is shown in FIG. 11;

DESCRIPTION OF THE PREFERRED EMBODIMENTS

Figure 4:
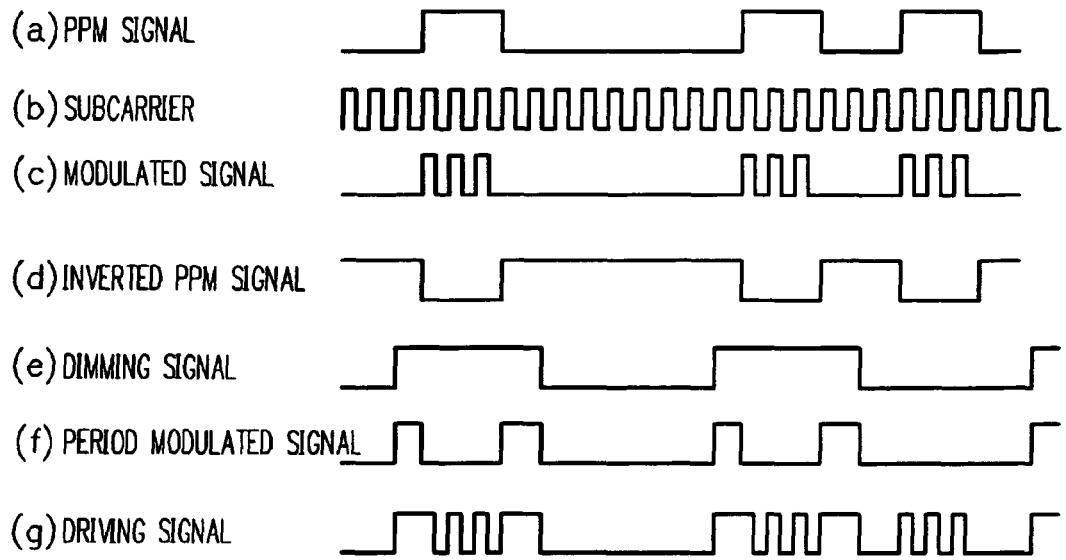
FIG. 4 is a first diagram showing signals outputted from circuits that compose the visible light control apparatus (visible light control circuit) according to the first embodiment that is shown in FIG. 2.

First, the features of a visible light control apparatus and a visible light control circuit according to an embodiment of the present invention will be described with reference to FIG. 2.

The visible light control apparatus according to the embodiment includes modulation means (corresponding to a PPM signal generation circuit 1, a subcarrier generation circuit 2, and a first AND circuit 4) that modulates a subcarrier and thereby generates a modulated signal; and visible light control means (corresponding to a driving circuit 8) that controls blinking of visible light which contains information, based on the modulated signal modulated by the modulation means (1, 2, and 4) and allows the visible light to be emitted at a predetermined emission time ratio. The visible light control apparatus is characterized in that the apparatus includes emission time ratio control means (corresponding to a dimming signal generation circuit 3, an inverting circuit 5, a second AND circuit 6, and an OR circuit 7) that changes the predetermined emission time ratio and allows the visible light to be emitted at the changed emission time ratio. With these features, the brightness of visible light can be adjusted to an arbitrary level.

The visible light control circuit according to the embodiment includes a modulation circuit (corresponding to a PPM signal generation circuit 1, a subcarrier generation circuit 2, and a first AND circuit 4) that modulates a subcarrier and thereby generates a modulated signal; and a driving circuit 8 that controls blinking of visible light to be generated from an optical element 9, based on the modulated signal generated by the modulation circuit (1, 2, and 4) and allows the visible light to be emitted from the optical element 9 at a predetermined emission time ratio. The visible light control circuit is characterized in that the circuit includes a dimming signal generation circuit (corresponding to a dimming signal generation circuit 3) that generates a dimming signal for changing the predetermined emission time ratio which is based on the modulated signal; and a driving signal generation circuit (corresponding to an inverting circuit 5, a second AND circuit 6, and an OR circuit 7) that generates a driving signal which is obtained by changing a period of the modulated signal generated by the modulation circuit (1, 2, and 4), based on the dimming signal generated by the dimming signal generation circuit 3, wherein the driving circuit 8 controls the blinking of the visible light to be emitted from the optical element 9, based on the driving signal generated by the driving signal generation circuit (5, 6, and 7) and thereby allows the visible light to be emitted from the optical element 9 at an emission time ratio obtained by changing the predetermined emission time ratio which is based on the modulated signal. In this way, the brightness of visible light can be adjusted to an arbitrary level. Referring to the accompanying drawings, the visible light control apparatus (visible light control circuit) according to the embodiment will be described below.

First Embodiment

First, the configuration of a visible light control apparatus according to the present embodiment will be described with reference to FIG. 2.

The visible light control apparatus according to the present embodiment includes a PPM (Pulse Position Modulation) signal generation circuit 1, a subcarrier generation circuit 2, a dimming signal generation circuit 3, a first AND circuit 4, an inverting circuit 5, a second AND circuit 6, an OR circuit 7, a driving circuit 8, and an optical element 9.

The PPM signal generation circuit 1 is a circuit for outputting a PPM signal. The PPM signal generation circuit 1 converts a main digital signal to a PPM signal at a ratio of one PPM signal per frame which is determined by a frame signal, and then outputs the converted PPM signal.

The conversion (modulation) from the main signal to a PPM signal which is performed by the PPM signal generation circuit 1 is, for example, such that the main signal is converted to a PPM signal at a ratio of one PPM signal per frame. When the PPM signal generation circuit 1 performs quaternary position modulation, as shown in FIG. 3, when the main signal is "00", the PPM signal is "1000", and when the main signal is "01", the PPM signal is "0100", and when the main signal is "10", the PPM signal is "0010", and when the main signal is "11", the PPM signal is "0001". In the case of the quaternary position modulation, the mark rate of a PPM signal in one frame is 1/4. Note that position modulation performed by the PPM signal generation circuit 1 is not limited to quaternary position modulation and other multilevel position modulation such as binary position modulation can also be performed.

The subcarrier generation circuit 2 is a circuit for outputting a subcarrier. The dimming signal generation circuit 3 is a circuit for outputting a dimming signal for changing an emission time ratio of visible light.

The first AND circuit 4 combines the PPM signal outputted from the PPM signal generation circuit 1 and the subcarrier outputted from the subcarrier generation circuit 2 and thereby generates and outputs a modulated signal for allowing the optical element 9 to emit light at a predetermined emission time ratio. Note that the average power of the modulated signal generated by the first AND circuit 4 is constant and thus the brightness of visible light when the optical element 9 emits the visible light based on the modulated signal is constant, independent of the content of information to be transmitted included in the visible light. Accordingly, flicker of the visible light can be prevented.

The inverting circuit 5 generates an inverted PPM signal which is an inverted version of the PPM signal outputted from the PPM signal generation circuit 1, and then outputs the inverted PPM signal.

The second AND circuit 6 combines the inverted PPM signal outputted from the inverting circuit 5 and the dimming signal outputted from the dimming signal generation circuit 3 and thereby generates and outputs a period modulated signal for changing a period of the modulated signal outputted from the first AND circuit 4.

The OR circuit 7 combines the modulated signal outputted from the first AND circuit 4 and the period modulated signal outputted from the second AND circuit 6 and thereby generates and outputs a driving signal for controlling the driving circuit 8.

The driving circuit 8 controls blinking of the optical element 9 based on the driving signal outputted from the OR circuit 7 and allows visible light to be emitted at an emission time ratio which is based on the driving signal.

The optical element 9 emits visible light. The optical element 9 emits visible light of arbitrary brightness under the control of the driving circuit 8. Note that the optical element 9 is not limited to a particular device as long as the element emits visible light; for example, an LD (Laser Diode) or an LED (Light Emitting Diode) can be applied.

Now, a control operation of the visible light control apparatus shown in FIG. 2 will be described with reference to FIG. 4. FIG. 4 is a diagram showing signals outputted from the circuits that compose the visible light control apparatus shown in FIG. 2.

First, the PPM signal generation circuit 1 outputs a PPM signal shown in (a) of FIG. 4. The subcarrier generation circuit 2 outputs a subcarrier shown in (b) of FIG. 4. Then, the first AND circuit 4 generates and outputs, based on the PPM signal shown in (a) of FIG. 4 which is outputted from the PPM signal generation circuit 1 and the subcarrier shown in (b) of FIG. 4 which is outputted from the subcarrier generation circuit 2, a modulated signal shown in (c) of FIG. 4 which is an AND of the (a) PPM signal and the (b) subcarrier.

The inverting circuit 5 inverts the PPM signal shown in (a) of FIG. 4 which is outputted from the PPM signal generation circuit 1 and thereby generates and outputs an inverted PPM signal shown in (d) of FIG. 4.

The second AND circuit 6 generates, based on the inverted PPM signal shown in (d) of FIG. 4 which is outputted from the inverting circuit 5 and a dimming signal shown in (e) of FIG. 4 which is outputted from the dimming signal generation circuit 3, a period modulated signal shown in (f) of FIG. 4 which is an AND of the (d) inverted PPM signal and the (e) dimming signal, and then outputs the generated period modulated signal.

The OR circuit 7 generates, based on the modulated signal shown in (c) of FIG. 4 which is outputted from the first AND circuit 4 and the period modulated signal shown in (f) of FIG. 4 which is outputted from the second AND circuit 6, a driving signal shown in (g) of FIG. 4 which is an AND of the (c) modulated signal and the (f) period modulated signal, and then outputs the generated driving signal.

The driving circuit 8 controls blinking of the optical element 9 based on the driving signal shown in (g) of FIG. 4 which is outputted from the OR circuit 7, and allows visible light to be emitted from the optical element 9 at an emission time ratio which is based on the driving signal shown in (g) of FIG. 4, whereby the visible light which contains arbitrary information is transmitted.

As such, in the visible light control apparatus according to the present embodiment, the driving signal shown in (g) of FIG. 4 which is obtained by changing a period of the modulated signal shown in (c) of FIG. 4 is generated based on the dimming signal shown in (e) of FIG. 4 for changing the emission time ratio, and the driving circuit 8 controls blinking of the optical element 9 based on the generated driving signal, whereby the emission time ratio of the modulated signal shown in (c) of FIG. 4 is changed and visible light is emitted at the changed emission time ratio of the driving signal shown in (g) of FIG. 4. By this, visible light emitted from the optical element 9 can be adjusted to an arbitrary brightness level and the visible light which contains information can be transmitted at the adjusted arbitrary brightness level.

Figure 5:
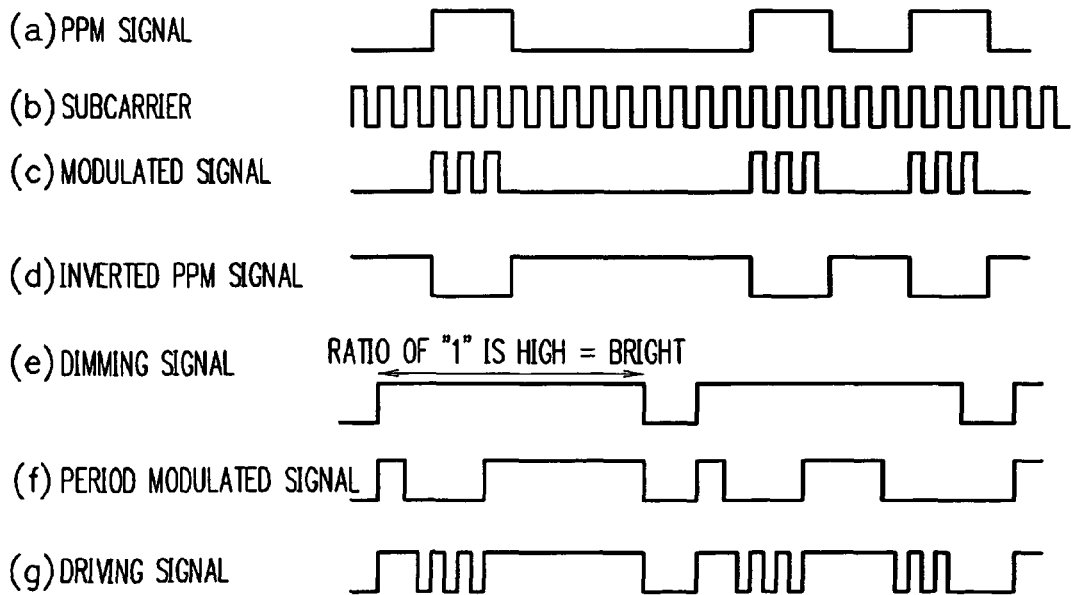
FIG. 5 is a second diagram showing signals outputted from the circuits that compose the visible light control apparatus (visible light control circuit) according to the first embodiment that is shown in FIG. 2, when a duty ratio of a dimming signal outputted from a dimming signal generation circuit 3 is adjusted and the dimming signal whose ratio of "1" is high is outputted.

Note that when the duty ratio of the dimming signal shown in (e) of FIG. 4 which is outputted from the dimming signal generation circuit 3 shown in FIG. 2 is adjusted and a dimming signal shown in (e) of FIG. 5 whose ratio of "1" is higher than that of the dimming signal shown in (e) of FIG. 4 is outputted from the dimming signal generation circuit 3, the second AND circuit 6 outputs a period modulated signal shown in (f) of FIG. 5 whose ratio of "1" is higher than that of the period modulated signal shown in (f) of FIG. 4, and accordingly, the OR circuit 7 that outputs a driving signal based on the period modulated signal outputs a driving signal shown in (g) of FIG. 5 whose ratio of "1" is higher than that of the driving signal shown in (g) of FIG. 4. By this, the driving circuit 8 controls blinking of the optical element 9 based on the driving signal shown in (g) of FIG. 5 whose ratio of "1" is high and which is outputted from the OR circuit 7, and visible light is emitted at an emission time ratio of the driving signal shown in (g) of FIG. 5 whose ratio of "1" is high; thus, the driving circuit 8 allows visible light that is brighter than that for the driving signal shown in (g) of FIG. 4 to be emitted, whereby the visible light containing information is transmitted. Hence, by adjusting the duty ratio of a dimming signal outputted from the dimming signal generation circuit 3, generating a driving signal based on the adjusted dimming signal, and controlling blinking of the optical element 9 by the driving circuit 8 based on the generated driving signal, it becomes possible to change the emission time ratio of visible light to be emitted from the optical element 9.

Second Embodiment

Now, a second embodiment will be described.

Figure 6:
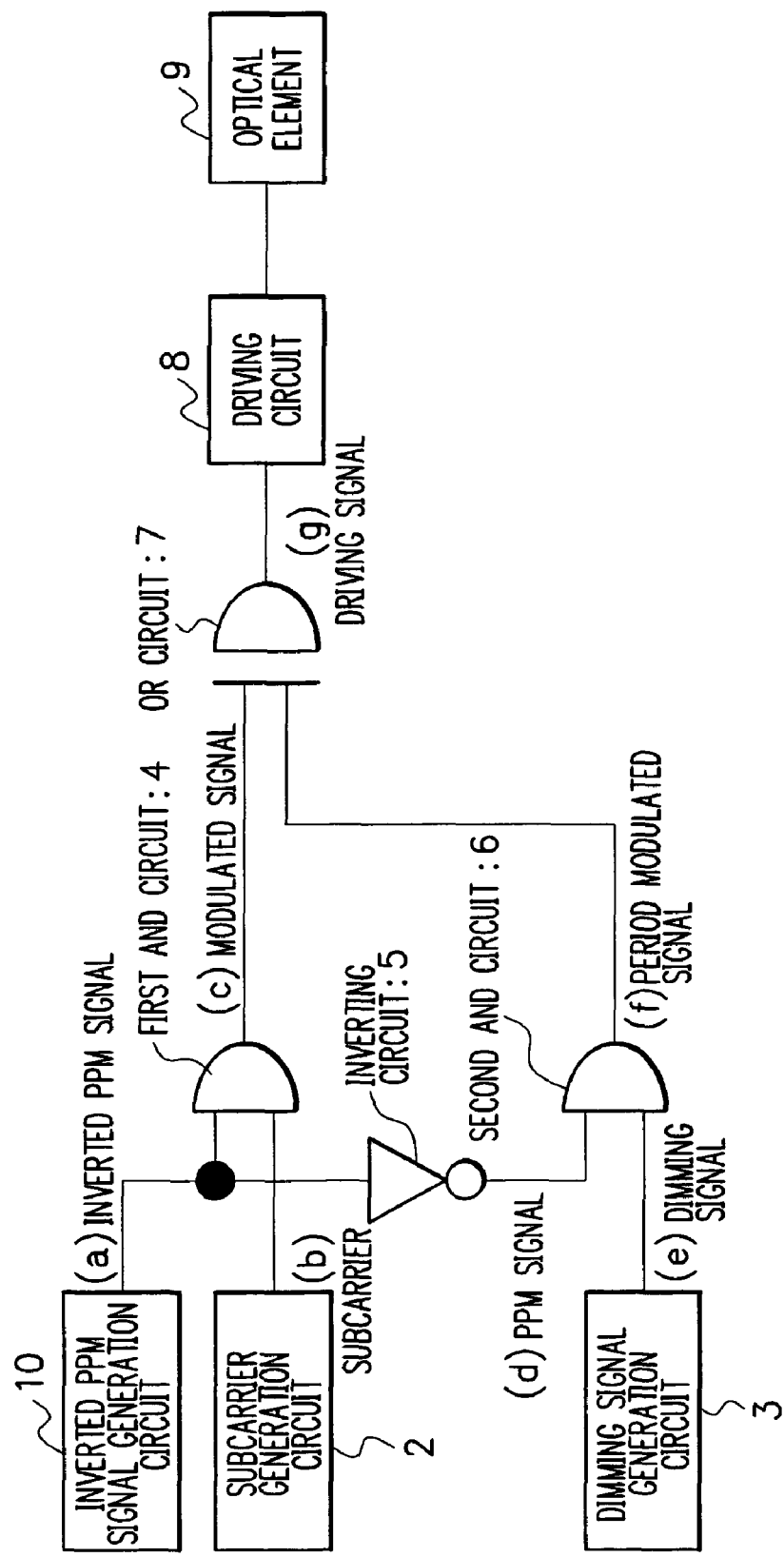
FIG. 6 is a diagram showing a configuration of a visible light control apparatus (visible light control circuit) according to a second embodiment.

A visible light control apparatus according to the second embodiment is characterized in that the PPM signal generation circuit 1 that composes the visible light control apparatus according to the first embodiment shown in FIG. 2 and outputs a PPM signal is replaced, as shown in FIG. 6, with an inverted PPM signal generation circuit 10 that outputs an inverted PPM signal which is an inverted version of a PPM signal. By this, as in the visible light control apparatus according to the first embodiment, the emission time ratio of the optical element 9 can be changed and visible light to be emitted from the optical element 9 can be adjusted to an arbitrary brightness level. The visible light control apparatus according to the second embodiment will be described below with reference to FIGS. 6 and 7.

First, the configuration of the visible light control apparatus according to the second embodiment will be described with reference to FIG. 6.

The visible light control apparatus according to the second embodiment is configured such that the PPM signal generation circuit 1 that composes the visible light control apparatus according to the first embodiment shown in FIG. 2 is replaced, as shown in FIG. 6, with the inverted PPM signal generation circuit 10 that outputs an inverted PPM signal which is an inverted version of a PPM signal.

Figure 7:
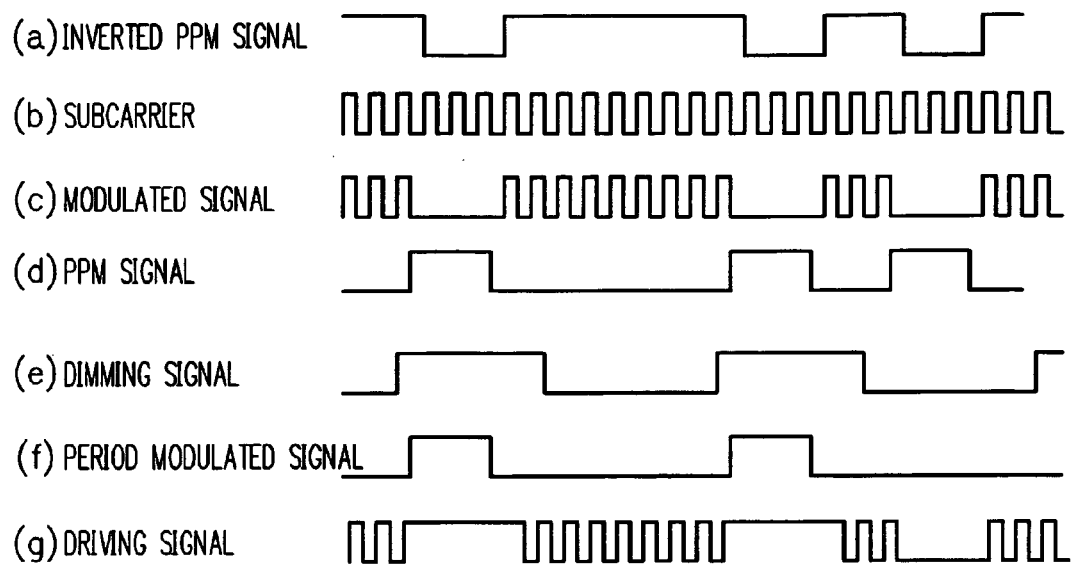
FIG. 7 is a diagram showing signals outputted from circuits that compose the visible light control apparatus (visible light control circuit) according to the second embodiment that is shown in FIG. 6.

Now, a control operation of the visible light control apparatus according to the second embodiment shown in FIG. 6 will be described with reference to FIG. 7. FIG. 7 is a diagram showing signals outputted from circuits that compose the visible light control apparatus shown in FIG. 6.

First, the inverted PPM signal generation circuit 10 outputs an inverted PPM signal shown in (a) of FIG. 7. The subcarrier generation circuit 2 outputs a subcarrier shown in (b) of FIG. 7. Then, the first AND circuit 4 generates, based on the inverted PPM signal shown in (a) of FIG. 7 and the subcarrier shown in (b) of FIG. 7, a modulated signal shown in (c) of FIG. 7 which is an AND of the (a) inverted PPM signal and the (b) subcarrier.

The inverting circuit 5 inverts the inverted PPM signal shown in (a) of FIG. 7 which is outputted from the inverted PPM signal generation circuit 10 and thereby generates a PPM signal shown in (d) of FIG. 7, and then outputs the generated PPM signal.

The second AND circuit 6 generates, based on the PPM signal shown in (d) of FIG. 7 and a dimming signal shown in (e) of FIG. 7 which is outputted from the dimming signal generation circuit 3, a period modulated signal shown in (f) of FIG. 7 which is an AND of the (d) PPM signal and the (e) dimming signal, and then outputs the generated period modulated signal.

The OR circuit 7 generates, based on the modulated signal shown in (c) of FIG. 7 and the period modulated signal shown in (f) of FIG. 7, a driving signal shown in (g) of FIG. 7 which is an AND of the (c) modulated signal and the (f) period modulated signal, and then outputs the generated driving signal.

The driving circuit 8 controls blinking of the optical element 9 based on the driving signal shown in (g) of FIG. 7 which is outputted from the OR circuit 7, and allows visible light to be emitted from the optical element 9 at an emission time ratio which is based on the driving signal, whereby the visible light which contains arbitrary information is transmitted.

As such, in the visible light control apparatus according to the second embodiment, as in the visible light control apparatus according to the first embodiment, the driving signal shown in (g) of FIG. 7 which is obtained by changing a period of the modulated signal shown in (c) of FIG. 7 is generated based on the dimming signal shown in (e) of FIG. 7 for changing the emission time ratio, and the driving circuit 8 controls blinking of the optical element 9 based on the generated driving signal, whereby the emission time ratio of the modulated signal shown in (c) of FIG. 7 is changed and visible light can be emitted at the changed emission time ratio of the driving signal shown in (g) of FIG. 7. By this, visible light emitted from the optical element 9 can be adjusted to an arbitrary brightness level and the visible light which contains information can be transmitted at the adjusted arbitrary brightness level.

Third Embodiment

Now, a third embodiment will be described.

Figure 8:
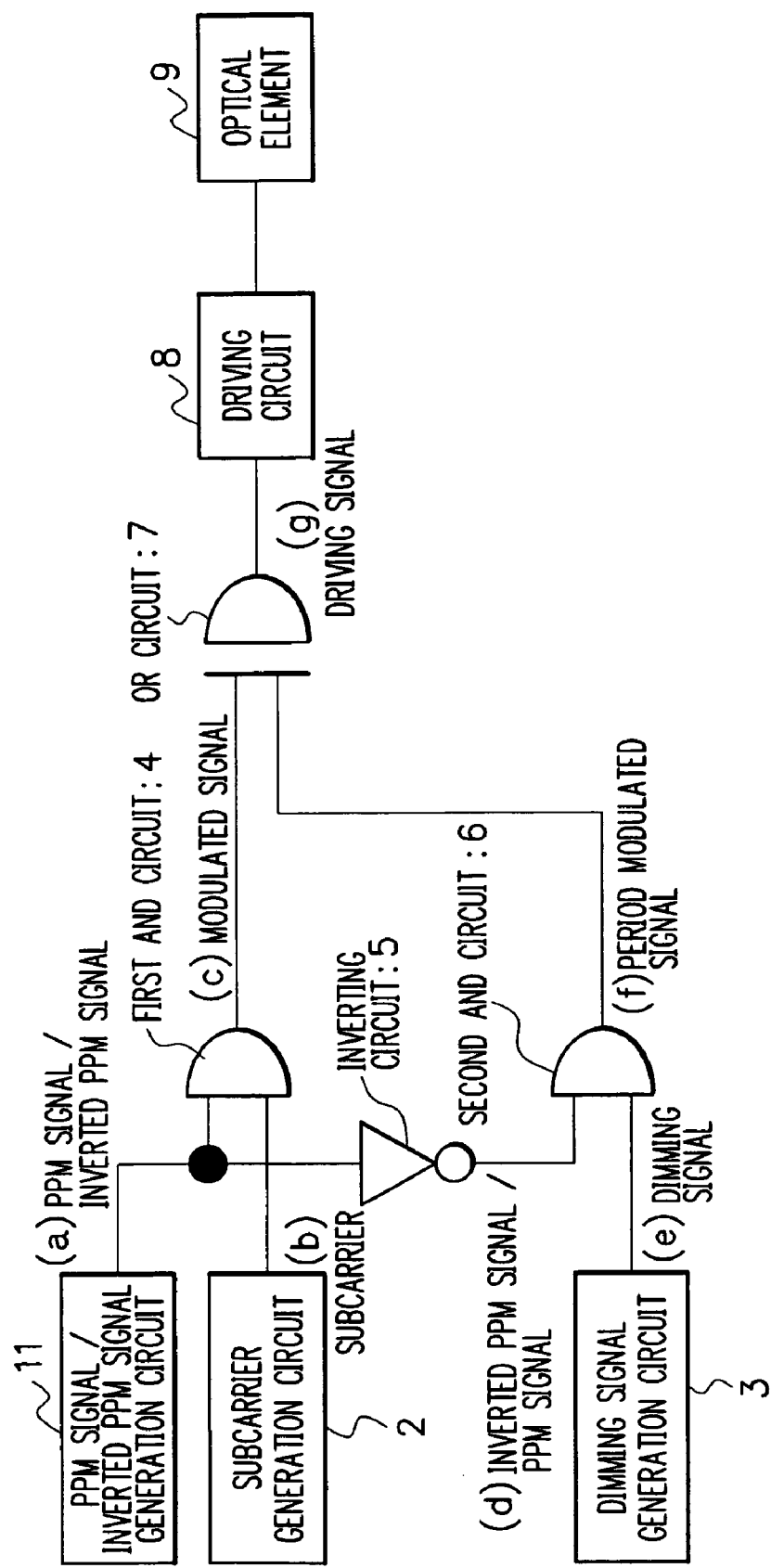
FIG. 8 is a diagram showing a configuration of a visible light control apparatus (visible light control circuit) according to a third embodiment.

A visible light control apparatus according to the third embodiment is characterized in that, as shown in FIG. 8, a PPM signal/inverted PPM signal generation circuit 11 that outputs a PPM signal or an inverted PPM signal is provided. By this, a PPM signal or an inverted PPM signal is outputted from the PPM signal/inverted PPM signal generation circuit 11 and the same control operation as that of the visible light control apparatus according to the first or second embodiment can be performed. The visible light control apparatus according to the third embodiment will be described below with reference to FIGS. 8 and 9.

First, the configuration of the visible light control apparatus according to the third embodiment will be described with reference to FIG. 8.

The visible light control apparatus according to the third embodiment is configured such that the PPM signal generation circuit 1 that composes the visible light control apparatus according to the first embodiment which is shown in FIG. 2 or the inverted PPM signal generation circuit 10 that composes the visible light control apparatus according to the second embodiment which is shown in FIG. 6 is replaced with the PPM signal/inverted PPM signal generation circuit 11 that outputs a PPM signal or an inverted PPM signal. By this, a PPM signal or an inverted PPM signal is outputted from the PPM signal/inverted PPM signal generation circuit 11.

Figure 9:
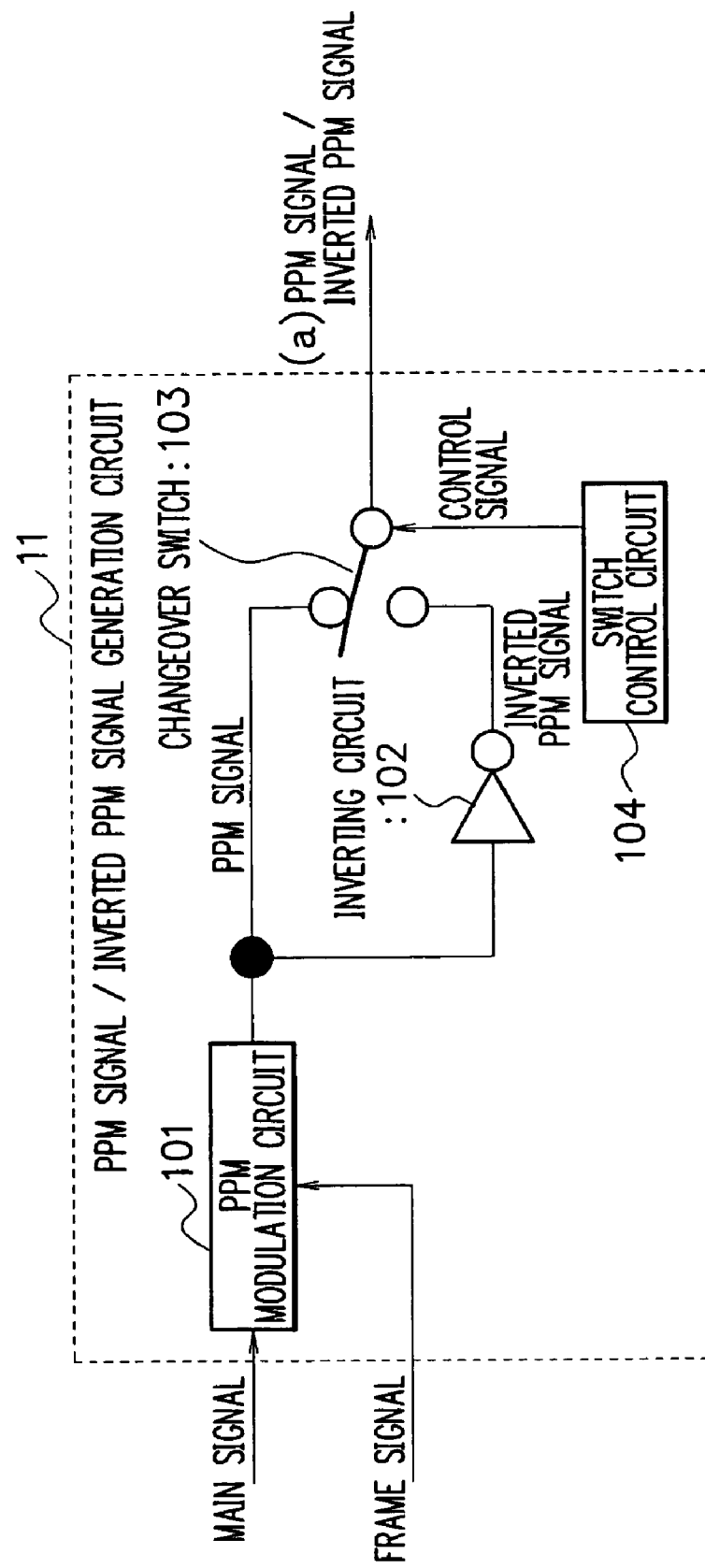
FIG. 9 is a diagram showing an internal configuration of a PPM signal/inverted PPM signal generation circuit 11 that composes the invisible light control apparatus (visible light control circuit) according to the third embodiment.

Now, the internal configuration of the PPM signal/inverted PPM signal generation circuit 11 shown in FIG. 8 will be described with reference to FIG. 9.

The PPM signal/inverted PPM signal generation circuit 11 includes a PPM modulation circuit 101, an inverting circuit 102, a changeover switch 103, and a switch control circuit 104.

The PPM modulation circuit 101 converts a main digital signal to a PPM signal at a ratio of one PPM signal per frame which is determined by a frame signal, and then outputs the converted PPM signal.

The inverting circuit 102 inverts the PPM signal outputted from the PPM modulation circuit 101 and then outputs the inverted PPM signal.

The changeover switch 103 changes over to either the PPM signal outputted from the PPM modulation circuit 101 or the inverted PPM signal outputted from the inverting circuit 102 and thereby selects a signal to be outputted from the PPM signal/inverted PPM signal generation circuit 11. Note that the changeover of the changeover switch 103 is performed based on a control signal to be outputted from the switch control circuit 104 and thereby a signal to be outputted from the PPM signal/inverted PPM signal generation circuit 11 is selected.

As such, in the visible light control apparatus according to the third embodiment, the changeover switch 103 changes over to either a PPM signal or an inverted PPM signal and thereby either signal is outputted from the PPM signal/inverted PPM signal generation circuit 11 The same control operation as that of the visible light control apparatus according to the first or second embodiment can be performed.

Fourth Embodiment

Now, a fourth embodiment will be described.

A visible light control apparatus according to the fourth embodiment is characterized in that the rate of change over time (change per unit time) of a driving signal at change points is relaxed and visible light is emitted from the optical element 9 at an emission time ratio of the relaxed driving signal. The driving signal is outputted from the OR circuit 7 that composes the visible light control apparatuses according to the first to third embodiments. By this, as in the visible light control apparatuses according to the first to third embodiments, even when the predetermined emission time ratio is changed, visible light is emitted at the changed emission time ratio, and the visible light emitted from the optical element 9 is controlled to be adjusted to an arbitrary brightness level, since, as shown in FIG. 10, only such noise "noise spectrum" that has a lower frequency component than a modulated signal "modulated signal spectrum" which is outputted from the first AND circuit 4 is generated, even if information is transmitted by the visible light whose brightness is adjusted to an arbitrary level, transmission error does not occur and highly accurate information communication can be performed. The visible light control apparatus according to the fourth embodiment will be described below with reference to FIGS. 10 to 13.

First, the configuration of the visible light control apparatus according to the fourth embodiment will be described with reference to FIG. 11.

The visible light control apparatus according to the fourth embodiment is characterized in that, as shown in FIG. 11, a variable time constant circuit 20 is provided that relaxes the rate of change over time of a driving signal at change points, the signal being outputted from the OR circuit 7. By this, the rate of change over time of a driving signal at change points can be relaxed, and by the driving circuit 8 controlling blinking of the optical element 9 based on the relaxed driving signal, visible light can be emitted from the optical element 9 at an emission time ratio of the relaxed driving signal.

Now, the internal configuration of the variable time constant circuit 20 shown in FIG. 11 will be described with reference to FIG. 12.

The variable time constant circuit 20 includes an analog switch 201, a resistor R 202, and a capacitor C 203.

The variable time constant circuit 20 shown in FIG. 12 controls switching on and off of the analog switch 201 based on a PPM signal outputted from the PPM signal generation circuit 1. When the PPM signal outputted from the PPM signal generation circuit 1 is "1", the variable time constant circuit 20 turns on the analog switch 201. When the PPM signal is "0", the variable time constant circuit 20 turns off the analog switch 201. By the on/off of the analog switch 201, the variable time constant circuit 20 relaxes the rate of change over time of a driving signal at change points and outputs the relaxed driving signal.

When the analog switch 201 is turned off, the rate of change over time of a driving signal at change points, which is outputted from the OR circuit 7, is relaxed with a large time constant which is determined by a resistance R of the resistor 202 and a capacitance C of the capacitor 203. When the analog switch 201 is turned on, the resistance R is lessened and thus the rate of change over time of the driving signal at the change points, which is outputted from the OR circuit 7, is relaxed with a smaller time constant than that for the case in which the analog switch 201 is turned off.

Now, a control operation of the visible light control apparatus according to the fourth embodiment which is shown in FIG. 11 will be described with reference to FIG. 13. FIG. 13 is a diagram showing signals outputted from circuits that compose the visible light control apparatus shown in FIG. 11.

The control operation of the visible light control apparatus according to the fourth embodiment is the same as that of the first embodiment until a driving signal shown in (g) of FIG. 13 is outputted from the OR circuit 7. The variable time constant circuit 20 switches the analog switch 201 shown in FIG. 12 on or off based on a PPM signal show in (a) of FIG. 13 which is outputted from the PPM signal generation circuit 1. The variable time constant circuit 20 then relaxes the rate of change over time of the driving signal at change points, which is shown in (g) of FIG. 13 and which is outputted from the OR circuit 7, with a time constant which is determined by on or off of the analog switch 201, and thereby generates a relaxed driving signal shown in (h) of FIG. 13 and outputs the relaxed driving signal. Then, the driving circuit 8 controls blinking of the optical element 9 based on the relaxed driving signal shown in (h) of FIG. 13 which is outputted from the variable time constant circuit 20, and allows visible light to be emitted from the optical element 9 at an emission time ratio which is based on the relaxed driving signal, whereby the visible light which contains arbitrary information is transmitted.

As such, in the visible light control apparatus according to the fourth embodiment which is shown in FIG. 11, the variable time constant circuit 20 relaxes the rate of change over time of the driving signal at change points, which is shown in (g) of FIG. 13 and which is outputted from the OR circuit 7, based on a PPM signal outputted from the PPM signal generation circuit 1, and thereby generates the relaxed driving signal shown in (h) of FIG. 13, and the driving circuit 8 controls blinking of the optical element 9 based on the generated relaxed driving signal, whereby visible light is emitted at an emission time ratio of the relaxed driving signal shown in (h) of FIG. 13, which is obtained by relaxing the rate of change over time of the driving signal shown in (g) of FIG. 13 at the change points. By this, even when visible light to be emitted from the optical element 9 is controlled to be adjusted to an arbitrary brightness level, since, as shown in FIG. 10, only such noise "noise spectrum" that has a lower frequency component than a modulated signal "modulated signal spectrum" which is outputted from the first AND circuit 4 is generated, even if information is transmitted by the visible light whose brightness is adjusted to an arbitrary level, transmission error does not occur and highly accurate information communication can be performed.

Figure 14:
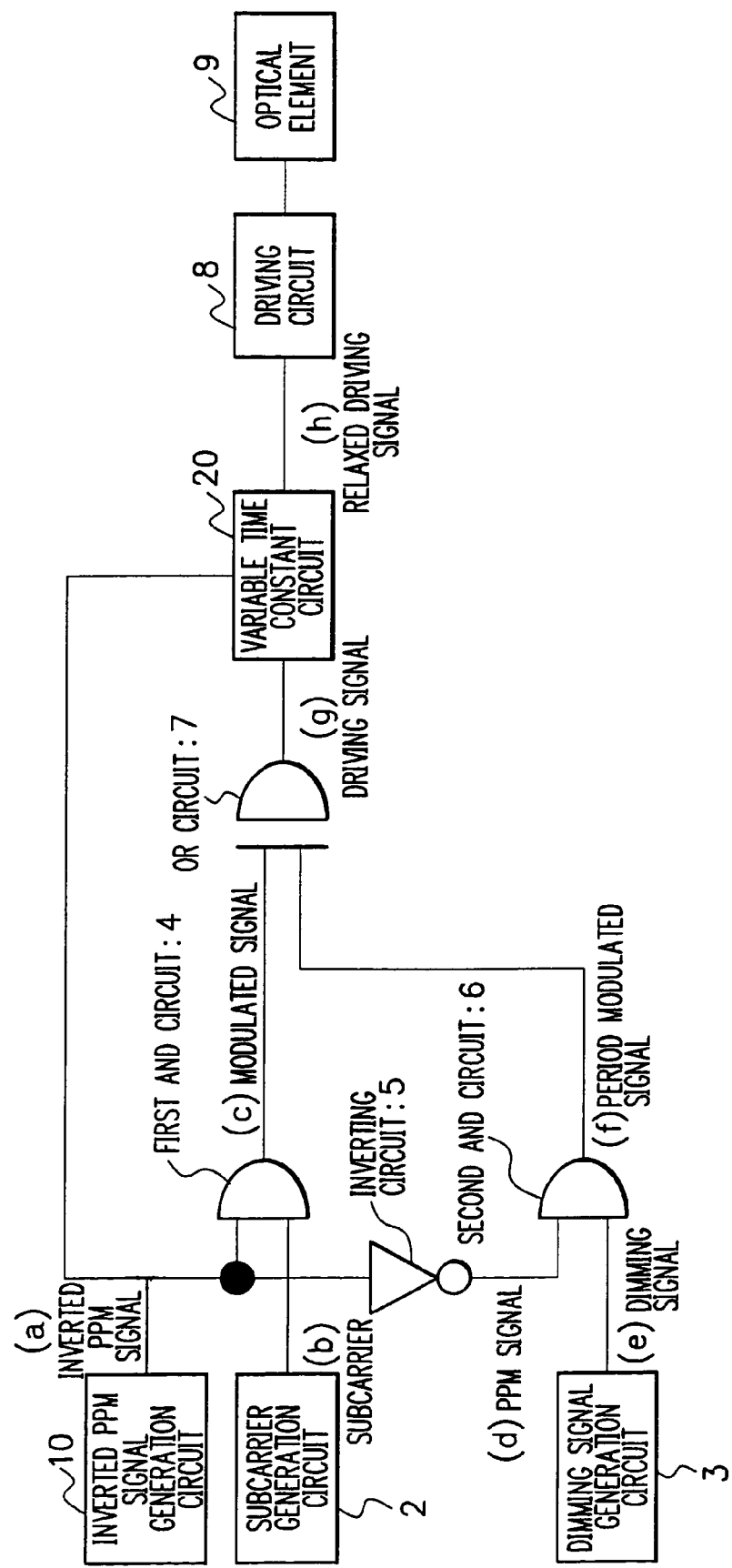
FIG. 14 is a second diagram showing a configuration of the visible light control apparatus (visible light control circuit) according to the fourth embodiment.
Figure 15:
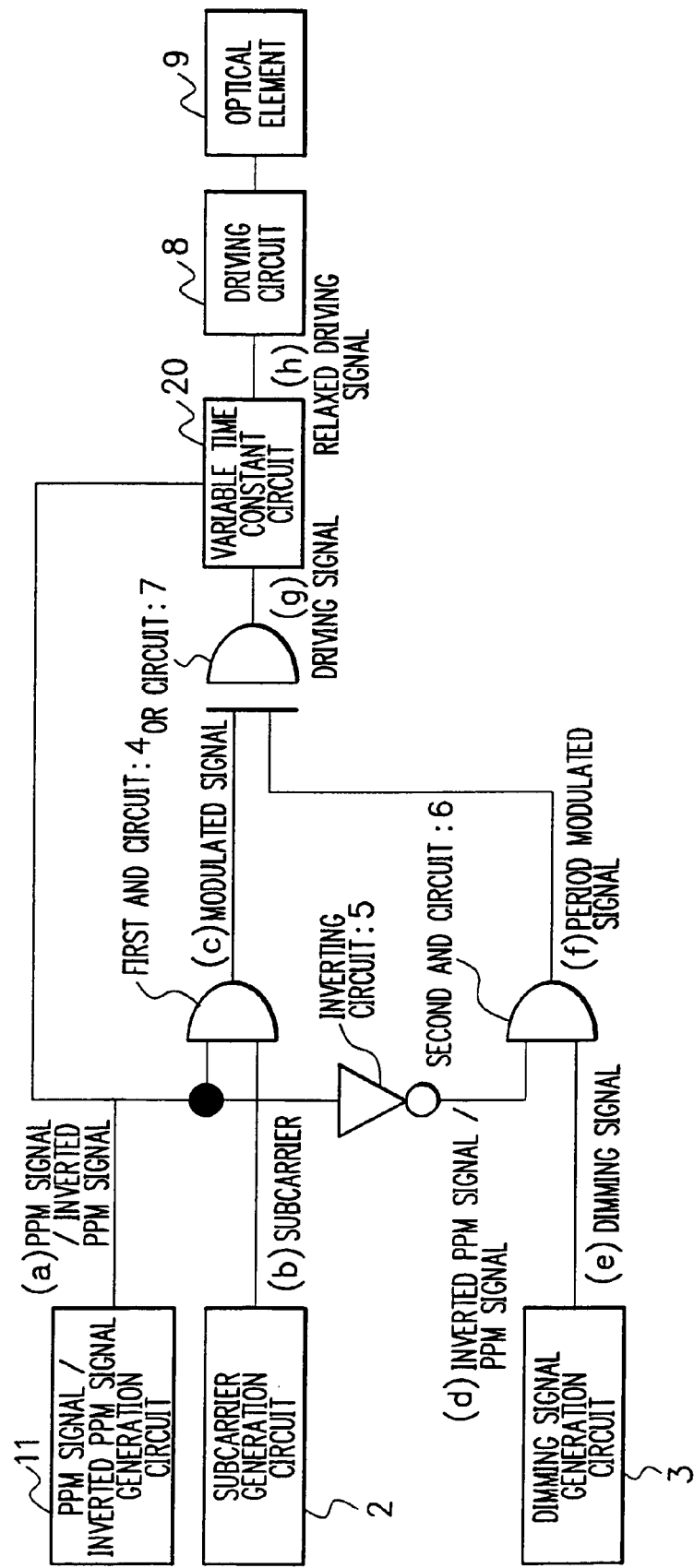
FIG. 15 is a third diagram showing a configuration of the visible light control apparatus (visible light control circuit) according to the fourth embodiment.

Although the aforementioned visible light control apparatus according to the fourth embodiment which is shown in FIG. 11 is configured such that the variable time constant circuit 20 is provided to the visible light control apparatus according to the first embodiment which is shown in FIG. 2, the variable time constant circuit 20 may also be provided to the visible light control apparatus according to the second embodiment which is shown in FIG. 6 and to the visible light control apparatus according to the third embodiment which is shown in FIG. 8, whereby configurations shown in FIGS. 14 and 15 are obtained and the aforementioned control operation is performed using such configurations.

FIG. 14 shows the configuration in which the variable time constant circuit 20 is provided to the visible light control apparatus according to the second embodiment which is shown in FIG. 6. In the visible light control apparatus shown in FIG. 14, the variable time constant circuit 20 generates, based on an inverted PPM signal outputted from the inverted PPM signal generation circuit 10, a relaxed driving signal which is obtained by relaxing the rate of change over time of a driving signal at change points, which is outputted from the OR circuit 7, and then outputs the generated relaxed driving signal to the driving circuit 8.

FIG. 15 shows the configuration in which the variable time constant circuit 20 is provided to the visible light control apparatus according to the third embodiment which is shown in FIG. 8. In the visible light control apparatus shown in FIG. 15, the variable time constant circuit 20 generates, based on a PPM signal or an inverted PPM signal which is outputted from the PPM signal/inverted PPM signal generation circuit 11, a relaxed driving signal which is obtained by relaxing the rate of change over time of a driving signal at change points, which is outputted from the OR circuit 7, and then outputs the generated relaxed driving signal to the driving circuit 8.

As such, the visible light control apparatus according to the fourth embodiment generates, based on a PPM signal or an inverted PPM signal, a relaxed driving signal which is obtained by relaxing the rate of change over time of a driving signal at change points, and emits visible light from the optical element 9 at an emission time ratio of the generated relaxed driving signal. Since only such noise "noise spectrum" that has a lower frequency component than a modulated signal "modulated signal spectrum" which is outputted from the first AND circuit 4 is generated as shown in FIG. 10 even if the visible light is adjusted to an arbitrary brightness level, when information is transmitted by the visible light whose brightness is adjusted to an arbitrary level, transmission error does not occur and highly accurate information communication can be performed.

It is to be understood that the above-described embodiments are the preferred embodiments of the present invention and thus the scope of the present invention is not limited only to the above-described embodiments and various changes may be made to the embodiments without departing from the sprit and scope of the invention. For example, by mounting the aforementioned visible light control apparatus (visible light control circuit) according to any of the embodiments of the present invention on a visible light communication apparatus that performs information communication using visible light, information communication can be performed based on visible light whose brightness is adjusted to an arbitrary level by the mounted visible light control apparatus (visible light control circuit).

The control operation performed by the aforementioned visible light control apparatuses (visible light control circuits) according to the embodiments of the present invention can be performed not only by hardware but also by software such as a computer program. The program may be stored in a recording medium such as an optical recording medium, a magnetic recording medium, a magneto-optical recording medium, or a semiconductor, and the program may be read from the recording medium into an electronic device having an optical element 9, whereby the aforementioned control operation can be performed by the electronic device having the optical element 9. Alternatively, the program may be read into an electronic device having an optical element 9 from an external device connected to the electronic device via a predetermined network, whereby the aforementioned control operation can be performed by the electronic device having the optical element 9.

The visible light control apparatus, visible light control circuit, visible light communication apparatus, and visible light control method of the present invention are applicable to an electronic device having an optical element 9.

What is claimed is:

1. A visible light control apparatus comprising:
   modulation means for modulating a subcarrier signal by an input signal and thereby generating a modulated signal;
   visible light control means for controlling, based on the modulated signal, blinking of visible light which contains information and allowing the visible light to be emitted at a predetermined emission time ratio; and
   emission time ratio control means for changing the predetermined emission time ratio and allowing the visible light to be emitted at the changed emission time ratio.

2. The visible light control apparatus according to claim 1, further comprising emission time ratio relaxation control means for relaxing a rate of change over time of the changed emission time ratio at a change point and allowing the visible light to be emitted at the relaxed emission time ratio.

3. The visible light control apparatus according to claim 1, wherein
   the emission time ratio control means includes:
   period modulated signal generation means for generating a period modulated signal that changes a period of the modulated signal; and
   driving signal generation means for combining the period modulated signal and the modulated signal, and thereby generating a driving signal that controls the blinking of the visible light,
   and the emission time ratio control means controls the blinking of the visible light based on the driving signal, changes the predetermined emission time ratio, and allows the visible light to be emitted at the changed emission time ratio.

4. The visible light control apparatus according to claim 1, wherein
   the modulation means includes:
   signal conversion means for converting a main signal to a multilevel PPM (Pulse Position Modulation) signal or to an inverted multilevel PPM signal which is an inverted version of the multilevel PPM signal,
   and the modulation means modulates the subcarrier based on the multilevel PPM signal or the inverted multilevel PPM signal, and thereby generates the modulated signal.

5. The visible light control apparatus according to claim 3, wherein
   the period modulated signal generation means includes:
   dimming signal generation means for generating a dimming signal for changing the predetermined emission time ratio,
   and the period modulated signal generation means, which is a logical AND circuit, combines the dimming signal and the multilevel PPM signal or the inverted multilevel PPM signal, and thereby generates the period modulated signal.

6. The visible light control apparatus according to claim 5, wherein
the dimming signal generation means includes:
adjustment means for adjusting a duty ratio of the dimming signal, and
the dimming signal generation means generates the dimming signal whose duty ratio is adjusted by the adjustment means.

7. The visible light control apparatus according to claim 4, further comprising emission time ratio relaxation control means, wherein the emission time ratio relaxation control means enlarges, based on the multilevel PPM signal or the inverted multilevel PPM signal, a rate of change over time of the changed emission time ratio at a change point.

8. The visible light control apparatus according to claim 4, further comprising signal selection means for selecting one of the multilevel PPM signal and the inverted multilevel PPM signal.

9. A visible light communication apparatus having mounted thereon the visible light control apparatus according to any one of claims 1 to 8, wherein the visible light control apparatus controls blinking of visible light to be emitted from an optical element and transmits the visible light.

10. A visible light control circuit including: a modulation circuit that modulates a subcarrier signal by an input signal and thereby generates a modulated signal;
driving circuit that controls, based on the modulated signal, blinking of visible light to be emitted from an optical element and allows the visible light to be emitted from the optical element at a predetermined emission time ratio;
a dimming signal generation circuit that generates a dimming signal for changing the predetermined emission time ratio which is based on the modulated signal; and
a driving signal generation circuit that generates, based on the dimming signal, a driving signal which is obtained by changing a period of the modulated signal, wherein
the driving circuit controls the blinking of the visible light to be emitted from the optical element, based on the driving signal, and thereby allows the visible light to be emitted from the optical element at an emission time ratio which is obtained by changing the predetermined emission time ratio which is based on the modulated signal.

11. A visible light communication apparatus having mounted thereon the visible light control circuit according to claim 10, wherein the visible light control circuit controls blinking of visible light to be emitted from the optical element and transmits the visible light.

12. A visible light control method which is performed by a visible light control apparatus that controls blinking of visible light containing information, the method comprising:
a modulation step of modulating a subcarrier by an input signal, whereby a modulated signal is generated;
a visible light control step of controlling, based on the modulated signal, the blinking of the visible light and allowing the visible light to be emitted at a predetermined emission time ratio; and
an emission time ratio control step of changing the predetermined emission time ratio and allowing the visible light to be emitted at the changed emission time ratio.

13. The visible light control method according to claim 12, further comprising an emission time ratio relaxation control step of relaxing a rate of change over time of the changed emission time ratio at a change point and allowing the visible light to be emitted at the relaxed emission time ratio.

14. The visible light control method according to claim 13, wherein in the emission time ratio relaxation control step which enlarges a rate of change over time of the changed emission time ratio at a change point, based on the multilevel PPM signal or the inverted multilevel PPM signal, a rate of change over time of the changed emission time ratio at a change point is relaxed.

15. The visible light control method according to claim 12, further comprising:
a period modulated signal generation step of generating a period modulated signal that changes a period of the modulated signal; and
a driving signal generation step of combining the period modulated signal and the modulated signal, whereby a driving signal that controls the blinking of the visible light is generated, wherein
in the emission time ratio control step, the blinking of the visible light is controlled based on the driving signal, the predetermined emission time ratio is changed, and the visible light is allowed to be emitted at the changed emission time ratio.

16. The visible light control method according to claim 12, further comprising a signal conversion step of converting a main signal to a multilevel PPM (Pulse Position Modulation) signal or an inverted multilevel PPM signal which is an inverted version of the multilevel PPM signal, wherein
in the modulation step, the subcarrier is modulated based on the multilevel PPM signal or the inverted multilevel PPM signal, whereby the modulated signal is generated.

17. The visible light control method according to claim 16, further comprising:
a dimming signal generation step of generating a dimming signal for changing the predetermined emission time ratio; and
period modulated signal generation step of generating a period modulated signal that changes a period of the modulated signal, wherein
in the period modulated signal generation step performed using a logical AND circuit for the dimming signal and the multilevel PPM signal or the inverted multilevel PPM signal, the dimming signal generated in the dimming signal generation step and the multilevel PPM signal or the inverted multilevel PPM signal are combined, whereby the period modulated signal is generated.

18. The visible light control method according to claim 17, further comprising an adjustment step of adjusting a duty ratio of the dimming signal, wherein
in the dimming signal generation step, the dimming signal whose duty ratio is adjusted in the adjustment step is generated.

19. The visible light control method according to claim 16, further comprising a signal selection step of selecting one of the multilevel PPM signal and the inverted multilevel PPM signal.

* * * * *